United States Patent [19]

Steensen et al.

[11] Patent Number: 4,574,091

[45] Date of Patent: Mar. 4, 1986

[54] ASPARTAME-SWEETENED GELATIN DESSERT AND SWEETENING COMPOSITION THEREFOR

[75] Inventors: Wayne L. Steensen, Ridgefield; Ronald C. Weaver, Danbury, both of Conn.

[73] Assignee: Nabisco Brands, Inc., Parsippany, N.J.

[21] Appl. No.: 625,505

[22] Filed: Jun. 28, 1984

[51] Int. Cl.[4] .............................................. A23L 1/04
[52] U.S. Cl. .................................... 426/548; 426/576
[58] Field of Search ................................ 426/548, 576

[56] References Cited

U.S. PATENT DOCUMENTS

| | | | |
|---|---|---|---|
| 3,868,465 | 2/1975 | Furda et al. | 426/576 |
| 4,001,456 | 1/1977 | Glicksman et al. | 426/548 |
| 4,122,205 | 10/1978 | Burge et al. | 426/548 |
| 4,254,154 | 3/1981 | Eisenstadt | 426/548 |
| 4,254,155 | 3/1981 | Dwivedi et al. | 426/548 |
| 4,401,685 | 8/1983 | Brown et al. | 426/576 |
| 4,409,255 | 10/1983 | Danielson et al. | 426/576 |

*Primary Examiner*—Jeanette M. Hunter
*Attorney, Agent, or Firm*—Richard Kornutik

[57] ABSTRACT

A gelatin dessert mix adapted to be hydrated in an aqueous medium to form a gelled dessert, the mix containing gelatin, acid, buffer, flavor, the sweetener aspartame in an amount to provide sweetness in the gelled dessert, and small but effective amounts of a sugar alcohol and a maltodextrin sufficient to cause the gelled product to exhibit sweetness and taste characteristics closely similar to those of a sucrose-sweetened counterpart product. Also disclosed is a method in which the sweetness and taste characteristics of an edible product in which aspartame is employed to provide sweetness are made to more closely simulate those of a sucrose-sweetened counterpart product by inclusion of a sugar alcohol and maltodextrin therein.

24 Claims, No Drawings

ASPARTAME-SWEETENED GELATIN DESSERT AND SWEETENING COMPOSITION THEREFOR

BACKGROUND OF THE INVENTION

The present invention relates to the sweetener known as aspartame and, more particularly, to a gelatin dessert sweetened with aspartame. In addition, the invention relates to a composition for sweetening edible products and to a method for sweetening edible products.

The sweetener aspartame is a dipeptide compound which is described, in terms of most accurate chemical nomenclature, as 1-methyl-N-1-alpha-aspartyl-1-phenylalanine. In patents and literature, the dipeptide also has been referred to as aspartyl phenylalanine methyl ester and α-L-aspartyl-L-phenylalanine methyl ester. The chemical formula, preparation and use of aspartame and other dipeptide sweeteners are described, for example, in U.S. Pat. Nos. 3,492,131 and 3,642,491 to James M. Schlatter.

Since the time of aspartame's appearance as a sweetener, many workers in the field of edible food and drug products (including normally non-ingestible products such as chewing gums and chewable medicaments) have proposed the use of aspartame as a partial or total replacement for sucrose (or for other sweet mono-, di- and poly-saccharides used in place of or in addition to sucrose) in products normally sweetened therewith.

Certain of the physical-chemical characteristics of aspartame have necessitated modification of the formulation of some sucrose-sweetened products when the sucrose is replaced in whole or in part with aspartame. For example, because aspartame is about 150 times as sweet as sucrose, use of aspartame to provide the sweetening equivalent of the sucrose it replaces results in a substantial decrease in the bulk density of the product. Accordingly, if it is desired to market an aspartame-sweetened product in package and/or serving sizes equivalent to those of the sucrose-sweetened counterpart, the use of a suitable bulking agent is required. Another example relates to the poor dispersibility/solubility of aspartame, relative for example to sucrose, in certain aqueous food systems, which has led art workers to propose numerous methods and materials for making aspartame more sucrose-like in its solubility and dispersion characteristics.

With respect to organoleptic properties, and particularly sweetness perception and taste, the art generally has considered aspartame to be superior to the prior sucrose substitute of choice, saccharin, which possesses what is commonly characterized as a bitter, metallic aftertaste. However, it has been recognized that the sweetening effects of aspartame nevertheless are not truly "sucrose-like" and that simple substitution of aspartame for sucrose in sweetened products does not necessarily lead to a product similar to—or as desirable as—the sucrose-sweetened product.

Some efforts have been made to alter the sweetness perception and taste of aspartame. In U.S. Pat. No. 3,875,311 to Eisenstadt, dipeptide sweeteners, including aspartame, are characterized by the inventor as exhibiting a flat sweetness along with a slightly bitter aftertaste, and in beverages, a slightly delayed sweetness. These undesired taste effects are said to be avoided by a composition containing the dipeptide sweetener, postassium bitartrate (and/or sodium bicarbonate and/or potassium bicarbonate), and glucono delta lactone (and/or sodium or potassium gluconate) in specified ratios.

U.S. Pat. No. 3,875,312, also to Eisenstadt, similarly characterizes the taste of aspartame and other dipeptide sweeteners and proposes a composition containing dipeptide sweetener, potassium bitartrate (and/or sodium bicarbonate and/or potassium bicarbonate), and lactose and/or dextrose, in specified ratios.

U.S. Pat. No. 4,254,154, also to Eisenstadt, describes a composition said to have a sweetness close to that of natural sugar using only a small amount of dipeptide sweetener (e.g. aspartame). The composition consists of aspartame, glycyrrhizin, potassium bitartrate and a sugar (e.g, sucrose, dextrose, fructose, lactose) or a sugar alcohol (e.g., xylitol, mannitol, sorbitol).

In U.S. Pat. No. 3,934,047 to Schade, dipeptide sweeteners such as aspartame are described as having a lingering sweet aftertaste. This aftertaste is said to be eliminated by mixing with the dipeptide sweetener a small amount of either aluminum potassium sulfate and/or Naringin (4',5,7-trihydroxyflavanone-7-rhammoglucoside).

In Canadian Pat. No. 1,021,988 to Kaplow, et al., the use of depeptide sweeteners such as aspartame in beverages is said to produce a distinct oral coating or clawing sensation when the consumer drinks a significant quantity of the beverage. This effect is said to be ameliorated by including an acid-soluble whey protein in the dipeptide sweetened beverage.

In U.S. Pat. No. 4,399,162 to Okada, dipeptide sweeteners such as aspartame are said to possess a clear initial sweet taste without leaving an unpleasant bitter taste; however, it is further stated that the sweetness of the dipeptide sweeteners does not last as long as that of sucrose and that the dipeptide sweeteners "have a monotonous quality without thickness, and tend to lack roundness in their taste quality." To make the sweetening qualities of dipeptide sweeteners more like those of sucrose, the inventor proposes that the dipeptide sweetener be combined with a flavoring agent selected from sodium glutamate, sodium inosine-5'-phosphate, sodium guanosine-5'-phosphate and sodium aspartate.

Our primary objective relating to the present invention was the development of a mix which can be hydrated to provide a gelatin dessert, in which the sweetness is provided to the gelled dessert by aspartame rather than sucrose. Sucrose-containing gelatin dessert mixes per se are, of course, quite well known and generally are provided in a variety of fruit flavors, for example, lime, cherry, strawberry and orange. Sucrose-free gelatin dessert mixes sweetened with saccharin (or, in earlier times, with cyclamate or a saccharin/cyclamate combination) also are known.

Our initial findings with respect to replacement of the sucrose in a conventional fruit-flavored gelatin mix with aspartame was that the sweetness and taste of the resultant gelatin dessert was decidedly unlike that of the conventional sucrose-sweetened dessert, to a degree believed even greater than that experienced in other food systems where sucrose is replaced with aspartame. Accurate expression of the differences between the sweetness and taste of the aspartame-sweetened and sucrose-sweetened products is somewhat hampered by the inherent subjectivity of perceptions of sweetness and taste characteristics. In general, however, the aspartame-sweetened product exhibited an essentially flat sweetness profile characterized by an immediate perception of sweetness of a particular intensity and continuance of such sweetness, at essentially the same intensity, for long periods of time. This is unlike the profile for the sucrose-sweetened product wherein there is a more gradual build-up of sweetness to a peak intensity level, followed by a drop in intensity to near zero, all within a relatively brief period. In addition, the overall organoleptic response to the fruit flavors was found to differ, in an undesirable manner, in the aspartame-sweetened gelatin as compared to the action of these flavors in the sucrose-flavored product.

Resort to prior art methods for modifying sweetness and taste characteristics of dipeptide sweeteners such as aspartame was substantially unattractive and ineffective since the modifying agents employed in such methods are not particularly compatible with fruit-flavored gelatin desserts (from both an organoleptic and a functional point of view) and since such methods appear to be curing problems associated with the sweetness characteristics of dipeptides which were not present, or indeed were the antithesis of, the problems found in the fruit-flavored gelatin system.

SUMMARY OF THE INVENTION

The primary object of the present invention is to provide a sweetened gelatin dessert in which a dipeptide sweetener such as aspartame is employed to impart sweetness, and which is either sugar-free or contains sugar in an amount below that at which it would provide the predominant sweetness and taste characteristics of the dessert, which dessert nevertheless is closely similar in its sweetness and taste characteristics to a counterpart product in which sucrose is the sole or predominant sweetener.

As a consequence of our achievement of the foregoing object, as described in detail hereinafter, another object of the invention is to provide an edible product in which a dipeptide sweetener such as aspartame is employed to impart sweetness, and which is either sugar-free or contains sugar in an amount below that at which it would provide the predominant sweetness and taste characteristics of the product, which product nevertheless is closely similar in its sweetness and taste characteristics to a counterpart product in which sucrose is the sole or predominant sweetener.

Further objects of the invention include methods for preparing edible products as described above, and the provision of a dipeptide sweetener-containing sweetening composition for use in sweetening edible products.

Yet additional objects of the invention will be apparent from the subsequent description and discussion of the attainment of the foregoing objectives.

In accordance with the primary object of the invention, a gelatin dessert mix is provided from which can be prepared a gelled dessert in which a dipeptide sweetener, such as aspartame, is relied upon for sweetness and which is either sugar-free or contains sugar in a amount below that at which it would contribute the predominant sweetness and taste characteristics of the dessert. As noted, such products do not exhibit sweetness and taste characteristics sufficiently similar to those exhibited by a counterpart gelled dessert product in which sucrose is the sole or predominant sweetener. According to the invention, however, inclusion of small but effective amounts of both a sugar alcohol and a maltodextrin in the dessert mix (and, hence, in the gelled dessert product) renders the dessert product closely similar in its sweetness and taste characteristics to a counterpart product in which sucrose is the sole or predominant sweetener. The levels of sugar alcohol and maltodextrin in the gelled product are such as to provide the significant sweetness and taste advantages without adversely affecting overall functional properties of the dessert product or the organoleptic perception of the fruit flavors therein.

The essential components of a dessert mix according to the invention, which is intended to be hydrated with an aqueous medium to produce a gelled dessert product are (a) gelatin; (b) acidulant; (c) buffer; (d) flavor, particularly fruit flavor; (e) a dipeptide sweetener in an amount which provides sweetness to the final gelled dessert; and (f) small but effective amounts of a sugar alcohol and a maltodextrin to cause the gelled dessert product to exhibit sweetness and taste characteristics closely similar to those exhibited by a counterpart product sweetened solely with sucrose or in which sucrose is the predominant sweetener.

The dessert mix and the gelled dessert prepared therefrom can, and preferably will be, "sugar-free".

"Sugar-free" is intended to describe products which are formulated on the basis that nutritive sweet mono-, di- or polysaccharides are not employed at any level at which significant sweetness or calories would be imparted to the product by them. The proposed use herein of a sugar alcohol and maltodextrin is consistent which such definition since, as will be explained, such materials are employed in very small amounts at which no perceptible sweetness or calories are contributed by them to the product. In addition, certain flavors or colors conventionally employed in edible products may be found to contain a sugar as part of a carrier system therefor, but these materials are employed in such small amounts relative to the edible product that no perceptible sweetness or calorie contribution is made by them.

It is within the scope of the invention, however, that the gelled dessert product (as well as other edible products to which the invention herein applies) can contain sugar. Thus, products in which dipeptide sweetener is present in a sweetening amount and in which sugar is present in an amount which is not so high as to completely dominate the sweetness and taste characteristics of the product will, absent modification according to the invention, fail to exhibit sweetness and taste characteristics closely similar to those exhibited by a counterpart product in which sucrose is the sole or predominant sweetener. The inclusion of a sugar alcohol and a maltodextrin in such products will, however, bring their sweetness and taste characteristics closely in line with those exhibited by the counterpart product standard which is sweetened solely or predominantly with sucrose.

Apart from the specific gelatin dessert mix of the invention, the present invention provides a method for modifying any edible product in which dipeptide sweetener is used in a sweetening amount and which is either sugar-free or contains sugar in an amount below that at which it provides the predominant sweetness and taste characteristics of the product. The method comprises including with such product small but effective amounts of a sugar alcohol and a maltodextrin so as to cause the product to exhibit sweetness and taste characteristics closely similar to those exhibited by a standard counterpart product in which sucrose is the sole or predominant sweetener. This method is particularly applicable to fruit-flavored products.

There is further provided according to the invention a sweetening composition consisting of dipeptide sweetener, sugar alcohol and maltodextrin for use in any application in which a dipeptide sweetener is to be employed in an edible product in a sweetening amount and wherein the product is sugar-free or contains sugar in an amount below that at which it would constitute the predominant sweetness and taste characteristics of the product. The sweetening composition thus carries with it the sugar alcohol and maltodextrin required to render the edible product more closely similar in sweetness and taste characteristics to a counterpart standard edible product in which sucrose is the sole or predominant sweetener.

As used in the context of the present invention, "edible product" is intended to have a broad meaning and encompasses formulated products intended to be consumed and ingested as well as products, such as chewing gums and the like, which are not normally intended to be swallowed. The edible product can be a food or a medicament or other type pharmaceutical preparation.

In terms of actual commercial practice of the various embodiments of the present invention, it will be understood that, at present, the only dipeptide sweetener approved for food use is aspartame. Nevertheless, the invention is broadly applicable to dipeptide sweeteners as a class. Such sweeteners are described in the earlier-noted U.S. Pat. Nos. 3,492,131 and 3,642,491, as well as, for example in U.S. Pat. Nos. 3,714,139 and 3,800,046 and in R. H. Mazur, "Aspartic Acid-Based Sweeteners" in *Symposium: Sweeteners*, G. E. Inglett, Ed., AVI Publishing Co., Westport, Conn. (1974), all of which are incorporated by reference herein.

The term "maltodextrin" as used herein describes a product derived from the hydrolysis of starch, typically corn starch, and which has a dextrose equivalent (DE) of from about 1 to about 23 and, preferably, from about 9 to 15.

The term "sugar alcohol" as used herein describes a material selected from the group consisting of mannitol, sorbitol, glycerol and xylitol. Mannitol is the preferred sugar alcohol for use in the present invention.

DETAILED DESCRIPTION OF THE INVENTION

As earlier indicated, the preparation of a gelatin dessert sweetened with aspartame was our primary objective and, for such reason, is first described in detail hereinafter. Thereafter, reference is made to attainment of other objects of the invention. In all cases, the details provided herein are for purposes of explaining the invention and describing the best mode known to us for carrying out the invention. It is not intended that the otherwise stated scope of the invention be limited by this detailed presentation.

The gelatin dessert mix of the invention is a substantially dry (for example, less than about 7% moisture by weight), particulate, free-flowing mixture of essential ingredients which is adapted to be intimately admixed with an aqueous medium to form a gelled product.

The gelatin utilized in the dessert mix of the invention can be any food-grade gelatin conventionally employed in dessert products. Typically, the gelatin will be a pork Type A (acid form) gelatin having a bloom in the range of from about 150 to about 300, and preferably in the range of from about 225 to 275. In general, the gelatin can be prepared from any collagen source, including bone and hide, and can be derived from any suitable animal, including beef and pork sources.

When the gelatin dessert is to be sugar-free or contains only small amounts of sugar, the preferred gelatin employed in formulating the dry dessert mix will be one which is somewhat coarser, in terms of its particle size, than gelatins typically used in sugar-sweetened formulations in order to improve dispersion of the gelatin in the hydrating medium. In sugar-sweetened products, the sugar, which is present in considerable amounts, itself serves to disperse the gelatin and fine particle size gelatins can be used without concern for clumping or floating of the gelatin upon hydration. A particularly preferred form of gelatin for use herein is referred to in the art as "40 mesh" gelatin, such terminology being used to describe a gelatin which is ground through a No. 40 U.S. Standard Sieve Screen (or which is ground by any technique so as to provide a gelatin which has an average particle size and particle size distribution similar to that obtained if the gelatin were ground through a No. 40 screen).

The amount of gelatin employed in the dry mix is that required to produce a gelled product of acceptable gel or set strength upon hydration of the mix in water or other aqueous medium and after a suitable setting period. The amount will of course vary depending upon the particular type of gelatin employed and the overall characteristics of the hydrated dessert mix (e.g., pH). Generally, however, based upon the weight of the overall dessert (i.e., including the aqueous hydrating medium), the weight percent of gelatin will be in the range of from about 1.0 to about 2.0%, and more typically, in the range of from about 1.0 to about 1.4% by weight.

The gel or set strength of the final gelled product prepared from the dry mix of the invention can be characterized by standardized penetration values, which desirably will be in the range of from about 200 to 300 (mm), and most preferably within the range of from about 230 to 270 mm. These values are with reference to penetration measurements using a Micrometer Adjustment Penetrometer (Krebs Electric and Mfg. Co., N.Y., N.Y.) or equivalent device, employing a cone weight of 25.0 grams. To prepare samples for this standardized measurement, the dessert mix is dissolved in eight (8) ounces of boiling filtered water and the mixture allowed to stand for one minute. Eight (8) ounces of cold (10° C.±1° C.) filtered water are then further mixed in and four (4) ounces of the final solution then transferred to a bloom jar. The solution is allowed to set up in a chill bath (10° C.±1° C.) for one hour, at which point penetration values are measured. The penetrometer cone is positioned so that it just touches the surface of the gelled product and the clutch mechanism on the penetrometer is released for exactly five seconds. The depth of cone penetration (in mm) in that time interval is then read off the dial on the penetrometer.

Consistent with the objective of the present invention, i.e., the provision of an aspartame-sweetened dessert which is either sugar-free or which contains sugar in an amount below that at which it would constitute the predominant sweetness and taste characteristics of the final gelled product, the gelatin employed can be one which has been modified or treated to render it capable of producing a gelled product using cold water. Such cold water soluble gelatins are known in the art and may be employed in the invention herein provided, for sugar-free products, they do not rely upon the use of sweetening amounts of sugars to achieve the cold water solubility objective or, for sugar-containing products, they do not rely upon so large an amount of sugar as to cause the sugar to assume the predominant role in sweetness and taste characteristics of the final product.

An acidulant is an essential element of the dessert mix, as it is in sugar-sweetened dessert mixes, to provide the required degree of tartness to the final gelled product. Commonly employed acids are fumaric acid, adipic acid, citric acid and the like, and will be present in an amount effective to provide the desired tartness and, in conjunction with a buffer, to provide a pH in the final product of from about 3.0 to about 4.5. A buffer such as sodium citrate is employed to permit use of sufficient acid for tartness and flavor without excessively lowering the pH of the final product, since at low pH's more gelatin generally is required to attain a particular gel strength. Based upon the level of gelatin present in the mix and final product, the weight ratios of acid to gelatin and buffer to gelatin each generally will be on the order of from about 1:3 to about 1:6.

The gelatin dessert mix also will contain flavors and colors suitable for the particular product flavor being formulated. The flavors generally will be natural and/or synthetic fruit flavors such as cherry, lime, orange, strawberry, raspberry and the like.

The dipeptide sweetener, e.g., aspartame, is employed to provide sweetness in the final gelled product. In a sugar-free product, the dipeptide will be present in an amount sufficient to provide a normally acceptable degree of sweetness. As earlier indicated, the sweetening characteristics of dipeptide sweetener in the fruit-flavored gelatin systems of the present invention do not closely approximate those of sucrose in the same system, and the formulation requires modification according to the present invention in order to simulate the sucrose-sweetened counterpart product. As such, the level of dipeptide employed to provide "a normally acceptable degree of sweetness" is intended herein to refer to an amount of dipeptide sweetener which will provide an average sweetness intensity generally approximating the sweetness intensity obtained when sucrose is the sweetener for the product. The formulation modifications of the present invention are relied upon to bring the actual time-sweetness intensity profile of the dipeptide-sweetened product more in line with that obtained in the sucrose-sweetened counterpart.

In general, the weight percent of aspartame for a sugar-free product, based upon the weight of the final gelled product, will be in the range of from about 0.04 to about 0.12%, and more typically from about 0.07 to about 0.09%.

For a product which is not sugar-free, i.e., where one or more sugars will be present but at levels below that at which the sugars contribute the predominant sweetness and taste characteristics of the final product, the amount of aspartame or other dipeptide sweetener employed will vary according to the degree of sweetness desired and the degree of sweetness already provided by the sugars present.

According to the present invention, further essential ingredients of the dessert mix are a sugar alcohol and a maltodextrin.

It has been found that the inclusion of a sugar alcohol, such as mannitol, and a maltodextrin in a fruit-flavored gelatin dessert in which aspartame or other dipeptide sweetener is used in a sweetening amount and which is sugar-free or contains sugar below the level at which it contributes the predominant sweetness and taste characteristics of the gelatin dessert, products a final gelled dessert product which has sweetness and taste characteristics closely similar to those exhibited by a sucrose-sweetened counterpart of such product, particularly with respect to the initial build up of sweetness, the duration of peak sweetness intensity, the overall duration of sweetness perception, and taste perception of the fruit flavors. Insofar as can be determined, the benefits of sugar alcohol and maltodextrin inclusion in a dipeptide-sweetened fruit-flavored gelatin dessert cannot be accurately characterized independently; however, generally speaking, the maltodextrin appears to have the effect of cleansing the taste buds of lingering sweetness and taste otherwise produced by the dipeptide-sweetened product so as to prevent a build up of sweetness with successive ingestion of product portions as well as prepare the taste buds for accurate response to the sweetness presented with each new intake of product. The sugar alcohol tends to contribute a perception, with each ingestion of product, of a gradual build up of sweetness to a peak intensity of short duration followed by a somewhat rapid drop off of overall sweetness.

Generally, for a sugar-free product, the level of each of the sugar alcohol and the maltodextrin based on the weight of the overall final gelled dessert product will be in the range of from about 0.05 to about 0.2%, and more typically in the range of from about 0.09 to about 0.12% by weight. Based upon the typical weight level of aspartame or other dipeptide sweetener present in the mix and the final product, the weight ratio of each of the sugar alcohol and the maltodextrin to aspartame generally will be in the range of from about 1:1 to about 2:1, and this relationship can be used to fix amounts of sugar alcohol and maltodextrin required in non-sugar-free products.

The maltodextrin preferably has a DE in the range of about 9 to 15 and may, if desired, comprise a blend of maltodextrins of differing dextrose equivalents. The sugar alcohol may comprise a single sugar alcohol or a blend thereof.

The levels of sugar alcohol and maltodextrin employed are, relative to the final gelled product, extremely low and below those at which, in both a pure water system and particularly in the final gelled product, their inherent physical, chemical and organoleptic properties are generally perceptible. The ability to utilize such very small quantities of additive materials to overcome the sweetness and taste disadvantages present in an aspartame-sweetened fruit-flavored gelatin dessert is a significant advantage since it insures that the additives will not adversely affect other desirable functional and organoleptic properties of, or the coaction among, the ingredients in the mix and in the final gelled product. In addition, of course, the economics of being able to render the overall sweetness and taste of the product more like that of its sucrose-sweetened counterpart by resort to minor amounts of additive materials is highly attractive.

To a significant degree, our work with aspartame-sweetened fruit-flavored gelatin dessert products has led us to conclude that the ability to closely match the overall sweetness and taste characteristics of the sucrose-sweetened counterparts of such products appears to involve a coaction among sweetness characteristics per se and flavor or taste characteristics associated with fruit flavors, the acidity of the system and other like factors. It would appear, however, that the formulation modifications employed by us in the gelatin dessert system may also be employed for any fruit-flavored, acidic edible product or any fruit-flavored product or, indeed, for any edible product in which aspartame or other dipeptide sweetener is employed to provide sweetness and in which sugar is absent (sugar-free) or is present at a level such that it does not contribute the predominant sweetness and taste characteristics of the product. Accordingly, the present invention further comprises a method for rendering the overall sweetness and taste characteristics of a dipeptide-sweetened product (which is either sugar-free or, as above noted, contains sugar in an amount at which it does not contribute the predominant sweetness and taste characteristics of the product) closely similar to the sucrose-sweetened counterpart of such products by incorporating within the product a small but effective amount of a sugar alcohol and a maltodextrin. Based upon the final weight of the edible product (in sugar-free products) or upon the weight of aspartame or other dipeptide, the levels of sugar alcohol and maltodextrin will be as set forth in the preceding discussion of the gelatin dessert product.

As earlier noted, the present invention also provides a composition consisting of dipeptide sweetener, e.g., aspartame, a sugar alcohol and a maltodextrin. This composition is employed as would the dipeptide per se, but carries with it the agents required to render the edible product which is to be sweetened with the aspartame more closely similar in its sweetness and taste characteristics to the sucrose-sweetened counterpart product. The relative amounts of the materials of this composition are such that each of the sugar alcohol and the maltodextrin are present at 100% to 200% by weight of the aspartame or other dipeptide sweetener.

The invention is further illustrated with reference to the following examples.

EXAMPLE I

To prepare strawberry-flavored gelatin dessert mixes, the following particulate ingredients are dry-blended, the weight percent of each ingredient being chosen from the indicated ranges.

|  | Wt. Percent |
|---|---|
| Gelatin (12X) | 52–60 |
| Fumaric acid (gelatin grade) | 12–16 |
| Sodium citrate | 9–15 |
| Maltodextrin (DE 11–14) | 4–5 |
| Mannitol | 4–5 |
| Aspartame | 3–4 |
| Strawberry flavors | 3–4 |
| Colors | 0.4–0.8 |
| Ascorbic acid | 0.3–0.6 |

This dry mix can be used to prepare a gelatin dessert by adding to the mix (total mix weight=11.11 grams) one cup of hot water, stirring to dissolve the mix therein, then adding one cup of cold water, stirring for a brief period of time and then permitting the mixture to set at refrigerator temperature. The gelatin dessert so prepared is closely similar in sweetness and flavor characteristics and profile to a typical gelatin dessert sweetened with sucrose, and is superior in this regard to a dessert prepared from an identical formulation in which the maltodextrin and mannitol are absent.

When xylitol and sorbitol were individually used in place of mannitol in the above formulation (at the same levels at which mannitol was used) similar results were obtained with respect to the sweetness and taste characteristics of the gelatin dessert with the sorbitol-containing sample having a somewhat more intense overall level of sweetness.

EXAMPLE II 4.7 grams of mannitol, 4.7 grams of maltodextrin (DE-11) and 3.6 grams of aspartame are dry blended until an intimate admixture is formed. This composition is added to a conventional starch-based instant pudding formulation in which the sucrose normally present therein is absent, such that the level of aspartame in the final set pudding (obtained by hydrating the mix with milk and refrigerating) is about 0.09% by weight, to obtain a sugar-free pudding exhibiting sweetness and taste characteristics closely similar to those exhibited by the sucrose-sweetened counterpart.

What is claimed is:

1. A composition consisting of (a) dipeptide sweetener; (b) a sugar alcohol in a weight ratio of from about 1:1 to about 2:1 based on the weight of the dipeptide sweetener; and (c) maltodextrin in a weight ratio of from about 1:1 to about 2:1 based on the weight of the dipeptide sweetener.

2. A composition according to claim 1 wherein said dipeptide sweetener is aspartame.

3. A composition according to claim 2 wherein said sugar alcohol is mannitol.

4. An edible product containing a dipeptide sweetener in an amount to provide sweetness to the product, which product is either sugar-free or contains sugar in an amount below that at which it contributes the predominant sweetness and taste characteristics of the product, and further comprising a sugar alcohol and a maltodextrin in small but effective amounts to improve the overall taste and sweetness characteristics of the product and render such characteristics closely similar to those exhibited, by counterpart product in which sucrose is the sole or predominant sweetener, the amounts of each of said sugar alcohol and maltodextrin being from about 100% to about 200% by weight of the dipeptide sweetener present in said edible product.

5. An edible product according to claim 4 in which said dipeptide sweetener is aspartame.

6. An edible product according to claim 5 which is sugar-free and which contains from about 0.05 to about 0.2% by weight of each of said sugar alcohol and said maltodextrin.

7. An edible product according to claim 5 wherein said sugar alcohol is mannitol.

8. A method for improving the sweetness and taste characteristics of an edible product in which a dipeptide sweetener is present at a level sufficient to provide sweetness to the product, which product is either sugar-free or in which sugar is present at a level such that it does not contribute the predominant sweetness and taste characteristics of the product, said method comprising incorporating in said product a small but effective amount of a sugar alcohol and maltodextrin sufficient to cause said product to exhibit sweetness and taste characteristics closely similar to those exhibited by a counterpart product in which sucrose is the sole or predominant sweetener, the amounts of each of said sugar alcohol and maltodextrin so incorporated being from about 100% to about 200% by weight of the dipeptide sweetener present in said product.

9. A method according to claim 8 wherein said dipeptide sweetener is aspartame.

10. A method according to claim 9 wherein said edible product is sugar-free and wherein each of said sugar alcohol and maltodextrin is incorporated into said product in an amount of from about 0.05% to about 0.2% by weight of said product.

11. A method for rendering the sweetness and taste characteristics of a sugar-free, aspartame-sweetened edible product closely similar to those of the sucrose-sweetened counterpart of said edible product, comprising incorporating in said product a small but effective amount of a sugar alcohol and maltodextrin, each in an amount of from about 100% to about 200% by weight of said aspartame.

12. A method according to claim 11 wherein each of said sugar alcohol and maltodextrin is incorporated into said product in an amount of from about 0.05 to about 0.2% by weight of said product.

13. A dry particulate gelatin dessert mix adapted to be hydrated with an aqueous medium to form a gelled product which is either sugar-free or which contains sugar in an amount below that at which it contributes the predominant sweetness and taste characteristics of the gelled product, said mix comprising gelatin in an amount sufficient to obtain said gelled product; acidulant; buffer; flavor; dipeptide sweetener in an amount to provide sweetness to the gelled product; and a small but effective amount of a sugar alcohol and a maltodextrin sufficient to cause said gelled product to exhibit sweetness and taste characteristics closely similar to those exhibited by a counterpart product containing sucrose as the sole or predominant sweetener, the amounts of each of said sugar alcohol and maltodextrin being from about 100% to about 200% by weight of the dipeptide sweetener present in said mix.

14. A dry, particulate gelatin mix according to claim 13 in which said dipeptide sweetener is aspartame.

15. A dry, particulate gelatin mix according to claim 14 which is sugar-free and which contains from about 0.05 to about 0.2% of each of said sugar alcohol and said maltodextrin by weight of said gelled product.

16. A dry, particulate gelatin dessert mix according to claim 14 wherein said sugar alcohol is mannitol.

17. A dry particulate gelatin dessert mix adapted to be hydrated with an aqueous medium to form a sugar-free gelled product having sweetness and taste characteristics closely similar to those exhibited by a sucrose-sweetened counterpart product, comprising gelatin in an amount sufficient to obtain said gelled product; acidulant; buffer; flavor; aspartame in an amount effective to provide a normally acceptable degree of sweetness to said gelled product; and a small but effective amount of a sugar alcohol and a maltodextrin sufficient to cause said gelled product to exhibit sweetness and taste characteristics closely similar to those exhibited by a sucrose-sweetened counterpart product, the amounts of each of said sugar alcohol and maltodextrin being from about 100% to about 200% by weight of the aspartame present in said mix.

18. A dry, particulate gelatin dessert mix adapted to be hydrated with an aqueous medium to form a sugar-free gelled product, comprising gelatin in an amount sufficient to obtain said gelled product; acidulant; buffer; flavor; from about 0.04 to about 0.12% aspartame by weight of the gelled product; from about 0.05% to about 0.2% by weight, based upon the weight of the gelled product, of a sugar alcohol; and from about 0.05% to about 0.2% by weight, based upon the weight of the gelled product, of maltodextrin.

19. A dry, particulate mix according to claim 17 or 18 wherein said sugar alcohol is mannitol.

20. A dry, particulate mix according to claim 17 or 18 wherein said maltodextrin has a dextrose equivalent of from about 9 to 15.

21. A dry, particulate mix according to claim 17 or 18 wherein said acidulant is selected from the group consisting of fumaric acid, adipic acid, citric acid and mixtures thereof.

22. A dry, particulate mix according to claim 21 wherein said sugar alcohol is mannitol.

23. A method for preparing a sugar-free gelled product, comprising dissolving in an aqueous medium gelatin, acidulant, buffer, flavor, aspartame in an amount effective to provide a normally acceptable degree of sweetness to said gelled product, and a small but effective amount of a sugar alcohol and maltodextrin effective to cause said gelled product to exhibit sweetness and taste characteristics closely similar to those exhibited by a sucrose-sweetened gelled counterpart product; and thereafter permitting said dissolved mixture to set to a gelled state, the amount of said gelatin being sufficient to form said gelled product, the amount of aspartame being from about 0.04% to about 0.12% by weight of the gelled product and the amounts of each of said sugar alcohol and maltodextrin being from about 0.05% to about 0.2% by weight of the gelled product.

24. The gelled product produced according to claim 23.

* * * * *